US006999896B2

(12) United States Patent
Takahashi

(10) Patent No.: US 6,999,896 B2
(45) Date of Patent: Feb. 14, 2006

(54) IDENTICAL OBJECT DETERMINATION METHOD AND APPARATUS AND DISPLACEMENT CORRECTION METHOD AND APPARATUS

(75) Inventor: Yasushi Takahashi, Tokyo (JP)

(73) Assignee: Fuji Jukogyo Kabushiki Kaisha, Tokyo (JP)

( * ) Notice: Subject to any disclaimer, the term of this patent is extended or adjusted under 35 U.S.C. 154(b) by 57 days.

(21) Appl. No.: 10/609,578

(22) Filed: Jul. 1, 2003

(65) Prior Publication Data

US 2004/0098224 A1    May 20, 2004

(30) Foreign Application Priority Data

Jul. 3, 2002    (JP)    .................... P. 2002-194389

(51) Int. Cl.
*G01S 13/60*    (2006.01)
(52) U.S. Cl. .................. 702/181; 342/450; 701/207; 702/150; 702/94
(58) Field of Classification Search ............ 702/94, 702/95, 150, 152, 153, 155, 159; 340/10.4, 340/505, 524, 686.1, 995.17, 995.25, 993.28; 342/357.01, 357.08, 357.17, 450; 701/207, 701/213, 214
See application file for complete search history.

(56) References Cited

U.S. PATENT DOCUMENTS

| | | | |
|---|---|---|---|
| 4,809,178 A * | 2/1989 | Ninomiya et al. .......... 701/200 |
| 5,554,983 A * | 9/1996 | Kitamura et al. ........... 340/937 |
| 5,629,849 A * | 5/1997 | Ahn ............................ 701/50 |
| 5,757,287 A * | 5/1998 | Kitamura et al. ........... 340/937 |
| 5,806,019 A * | 9/1998 | Ishiyama .................... 701/207 |
| 5,893,043 A * | 4/1999 | Moehlenbrink et al. .... 701/207 |
| 6,025,797 A * | 2/2000 | Kawai et al. ................. 342/70 |
| 6,363,619 B1 * | 4/2002 | Schirmer et al. ............. 33/288 |
| 6,493,649 B1 * | 12/2002 | Jones et al. ................. 702/150 |
| 6,553,282 B1 * | 4/2003 | Shirai et al. .................. 701/1 |
| 6,618,496 B1 * | 9/2003 | Tassakos et al. ............ 382/154 |
| 6,636,635 B1 * | 10/2003 | Matsugu ..................... 382/218 |
| 6,674,687 B1 * | 1/2004 | Zeitzew ........................ 367/6 |

(Continued)

FOREIGN PATENT DOCUMENTS

EP    0 866 947 B1    4/2001

(Continued)

OTHER PUBLICATIONS

E. Young, R. Tribe, and R. Conlong, "Improved Obstacle Detection by Sensor Fusion," Oct. 15, 1992, IEE Colloquium on "Prometheus and DRIVE", Savoy Place, pp. 1-6.

(Continued)

*Primary Examiner*—Carol S. W. Tsai
(74) *Attorney, Agent, or Firm*—McGinn IP Law Group, PLLC

(57) ABSTRACT

An identical object determination method of determining whether or not objects are detected by a plurality of sensors identical has a determining a relative position and speed thereof, a determining a position error thereof based on the determined positions and calculating a first probability that the detected objects are identical with respect to the position from the determined position error based on a normal distribution concerning the position error, a determining a speed error thereof based on the determined speed and calculating a second probability that the detected objects are identical with respect to the speed from the determined speed error based on a normal distribution concerning the speed error, a calculating a third probability that the detected objects are identical based on the calculated first probability and the calculated second probability, and a determining that the detected objects are identical if the third probability exceeds a first determination value.

43 Claims, 9 Drawing Sheets

U.S. PATENT DOCUMENTS

2002/0177953 A1 * 11/2002 Okamura et al. ........... 701/301
2003/0227395 A1 * 12/2003 Zeineh ....................... 340/988

FOREIGN PATENT DOCUMENTS

| JP | 5-114099 | 5/1993 |
| JP | 6-230115 | 8/1994 |
| JP | 06-331400 | 12/1994 |
| JP | 9-218265 | 8/1997 |
| JP | 11-44756 | 2/1999 |
| JP | 2000-131432 | 5/2000 |
| JP | 2002-99906 | 4/2002 |

OTHER PUBLICATIONS

European Search Report dated Jan. 10, 2005.

* cited by examiner

IDENTICAL OBJECT DETERMINATION METHOD AND APPARATUS AND DISPLACEMENT CORRECTION METHOD AND APPARATUS

BACKGROUND OF THE INVENTION

1. Field of the Invention

The present invention relates to an identical object determination method and apparatus for determining whether or not objects detected by a plurality of sensors are identical and a displacement correction method and apparatus for correcting relative displacement of identical objects.

2. Description of the Related Art

In recent years, a monitoring system for recognizing a situation in one area or monitoring the situation in the area based on the recognition result has received attention and has become commercially practical in various applications of vehicle outside monitoring, railroad crossing monitoring, topographic recognition, an altimeter, etc. In this kind of monitoring system, to detect an object existing in an area, various sensors of a sensor using stereoscopic image processing for calculating the parallax of the object based on a pair of picked-up images, a laser radar, a millimeter wave radar, etc., are used. To execute recognition with high accuracy, using the sensors in combination is more advantageous than using the sensors singly. To use the sensors in combination, the sensors perform detection operation independently and thus it is necessary to determine whether or not the objects detected by the sensors are identical.

For example, JP-A-2000-131432 discloses a technique of using a millimeter wave radar and a laser radar in combination as sensors and determining whether or not the objects (obstacles) detected by the sensors are identical. In this related art, an obstacle detected by the millimeter wave radar and an obstacle detected by the laser radar in a determination area set surrounding that obstacle are determined identical.

JP-A-11-44756 and JP-A-09-218265 discloses attachment angle correction methods of a laser sensor and a camera. According to these methods, assuming that the objects detected by the sensors are identical, an attachment error of the sensors is corrected from the difference between the measurement values of the sensors. JP-A-6-230115 discloses a correction method of the distance measurement values of a laser sensor and a camera. According to this method, assuming that the objects detected by the laser sensor and the camera are identical, the distance measurement values are corrected from the difference between the distance measurement values provided by the laser sensor and the camera.

However, in the related art described in JP-A-2000-131432, a positional comparison between the objects detected by both the sensors is only made and therefore there is a possibility that the identical object will be determined two different objects (or two different objects will be determined the identical object). For example, in vehicle outside monitoring for monitoring the running circumstances ahead of the own vehicle, if an object running ahead of the own vehicle (preceding vehicle) and an object running in the opposite direction (oncoming vehicle) approach positionally, the objects maybe determined identical.

In the related arts concerning an error correction, basically an error correction is made assuming that the objects detected by the sensors are identical. However, in the related arts, if an error occurs to such an extent to which the objects detected by the sensors cannot be determined identical, the error cannot be corrected. Unless whether or not the objects detected by the sensors are identical is determined, the reliability of the error correction is not ensured.

SUMMARY OF THE INVENTION

It is therefore an object of the present invention to effectively determine whether or not objects detected by a plurality of sensors are identical.

It is another object of the present invention to determine whether or not objects detected by a plurality of sensors are identical, thereby correcting displacement of the objects detected by the sensors.

To the ends, according to a first aspect of the present invention, there is provided an identical object determination method of determining whether or not objects detected by a plurality of sensors are identical. In the identical object determination method, as a first step, a relative position and relative speed of each of the detected objects are determined. As a second step, first a position error of each of the detected objects is determined based on the determined positions. A first probability is calculated as the probability that the detected objects are identical with respect to the position from the determined position error based on a normal distribution concerning the position error when the plurality of sensors detect the identical object. As a third step, first a speed error of each of the detected objects is determined based on the determined speed. A second probability is calculated as the probability that the detected objects are identical with respect to the speed from the determined speed error based on a normal distribution concerning the speed error when the plurality of sensors detect the identical object. A fourth step calculates a third probability as the probability that the detected objects are identical based on the calculated first probability and the calculated second probability. A fifth step determines that the detected objects are identical if the third probability exceeds a first determination value.

In the first aspect of the present invention, if the third probability is smaller than the first determination value, preferably the identical object determination method further includes the following steps: As one step, the objects are extracted in any desired combination from the detected objects. A fourth probability is calculated as the probability that the extracted objects, each as a processed object, are identical. As another step, if the calculated fourth probability exceeds the first determination value, the extracted objects are determined identical.

In the first aspect of the present invention, if at least one of the sensors detects a plurality of objects, preferably the above-describe steps perform the following processing: First, as the second step, one object is selected from among the detected objects for each sensor, thereby forming groups, each as a processed object, as different combinations. The first probability is calculated as the probability that the objects making up each of the groups are identical with respect to the position. As the third step, the second probability is calculated as the probability that the objects making up each of the groups are identical with respect to the speed. As the fourth step, the third probability is calculated as the probability that the objects making up each of the groups are identical based on the calculated first probability and the calculated second probability. As the fifth step, the object detected by one of the sensors is adopted as the reference and the group having the maximum value of the third probability is determined from among the groups containing the reference object. If the third probability calculated for the determined group exceeds the first determination value, the objects making up the determined group are determined identical.

Here, if the third probability calculated for a first group containing the reference object and the third probability calculated for a second group containing the reference object, different from the first group exceed each the first determination value, preferably the fifth step includes the following steps: As one step, the third probability calculated for the first group and the third probability calculated for the second group are compared each with a second determination value greater than the first determination value. As another step, if the third probability calculated for the first group and the third probability calculated for the second group exceed each the second determination value, the objects making up the first group and the second group are determined identical. Alternatively, if either the third probability calculated for the first group or the third probability calculated for the second group exceeds the second determination value, the objects making up the group corresponding to the third probability exceeding the second determination value are determined identical.

In the first aspect of the present invention, preferably the identical object determination method further includes the step for correcting the calculated third probability based on history information indicating that the object detected by one sensor is determined identical with which of objects detected by a different sensor. In this case, as another step, preferably the calculated third probability is corrected based on history information indicating the number of successive times that the object detected by the one sensor has been determined identical with the object detected by the different sensor.

In the first aspect of the present invention, preferably the identical object determination method further includes the step for correcting the calculated third probability based on history information indicating the third probability calculated for the object detected by one sensor and the object detected by a different sensor.

Further, in the first aspect of the present invention, preferably the plurality of sensors are selected from the group containing a sensor for detecting an object based on a pair of picked-up images using stereoscopic image processing, a millimeter wave radar, and a laser radar.

According to a second aspect of the present invention, there is provided an identical object determination apparatus for determining whether or not objects detected by a plurality of sensors are identical using any of the identical object determination methods described in the first aspect of the present invention.

According to a third aspect of the present invention, there is provided an identical object determination method of determining whether or not objects detected by a plurality of sensors are identical. In the identical object determination method, as a first step, a relative position and relative speed of each of the detected objects are determined. As a second step, a position error of each of the detected objects is determined based on the determined positions and the determined position error is compared with a first determination value. Further, a speed error of each of the detected objects is determined based on the determined speed and the determined speed error is compared with a second determination value, whereby the detected objects are separated into the identical object and different objects.

Here, in the third aspect of the present invention, preferably the second step determines that the detected objects are identical if the determined position error is smaller than the first determination value and the determined speed error is smaller than the second determination value.

Further, in the third aspect of the present invention, preferably the plurality of sensors are selected from the group containing a sensor for detecting an object based on a pair of picked-up images using stereoscopic image processing, a millimeter wave radar, and a laser radar.

According to a fourth aspect of the present invention, there is provided an identical object determination apparatus for determining whether or not objects detected by a plurality of sensors are identical using any of the identical object determination methods described in the third aspect of the present invention.

According to a fifth aspect of the present invention, there is provided a displacement correction method of correcting relative displacement of identical objects detected by one sensor and a different sensor for detecting objects in cooperation with each other. In the displacement correction method, as a first step, a plurality of correction parameters for correcting relative displacement of the position of the object detected by the one sensor and the position of the object detected by the different sensor are set. As a second step, the position of the object detected by the different sensor is relatively corrected based on the correction parameter. As a third step, whether or not the object detected by the one sensor and the object detected by the different sensor, the position of which is corrected based on the correction parameter are identical is determined for each of the correction parameters. As a fourth step, the comparison results at the third step are compared, the correction parameter determined corresponding to the identical object having the best determination result is determined, and a feedback correction parameter for making feedback correction of relative displacement of the identical objects detected by the one sensor and the different sensor is determined based on the determined correction parameter.

Here, in the fifth aspect of the present invention, preferably the correction parameter is set based on a relative difference between an attachment position of the one sensor and an attachment position of the different sensor. Preferably, the correction parameter is set based on a relative detection position error between the one sensor and the different sensor. Further, preferably the correction parameter is set based on a relative detection time difference between the one sensor and the different sensor.

In the fifth aspect of the present invention, preferably the first step to the third step are repeated two or more times and if the number of times that the correction parameter has been determined corresponding to the identical object exceeds a predetermined determination value, the feedback correction parameter is determined based on the correction parameter. Alternatively, preferably the first step to the third step are repeated two or more times and if the number of times that the correction parameter has been determined corresponding to the identical object reaches the maximum, the feedback correction parameter is determined based on the correction parameter.

In the fifth aspect of the present invention, preferably, when comparing the comparison results at the third step, the fourth step uses only the determination result concerning the object more distant from the predetermined determination value with respect to the position.

In the fifth aspect of the present invention, preferably the plurality of correction parameters are divided into a plurality of groups and the correction parameters belonging to each group are used in one process. In this case, preferably each group contains one common correction parameter to the groups.

Further, in the fifth aspect of the present invention, preferably the third step uses any of the identical object determination methods described in the first aspect of the present invention or any of the identical object determination methods described in the third aspect of the present invention.

According to a sixth aspect of the present invention, there is provided a displacement correction apparatus for correcting relative displacement of identical objects detected by a plurality of sensors for detecting objects in cooperation with each other using any of the displacement correction methods described in the fifth aspect of the present invention.

DETAILED DESCRIPTION OF THE PREFERRED EMBODIMENTS (First Embodiment)

Figure 1:
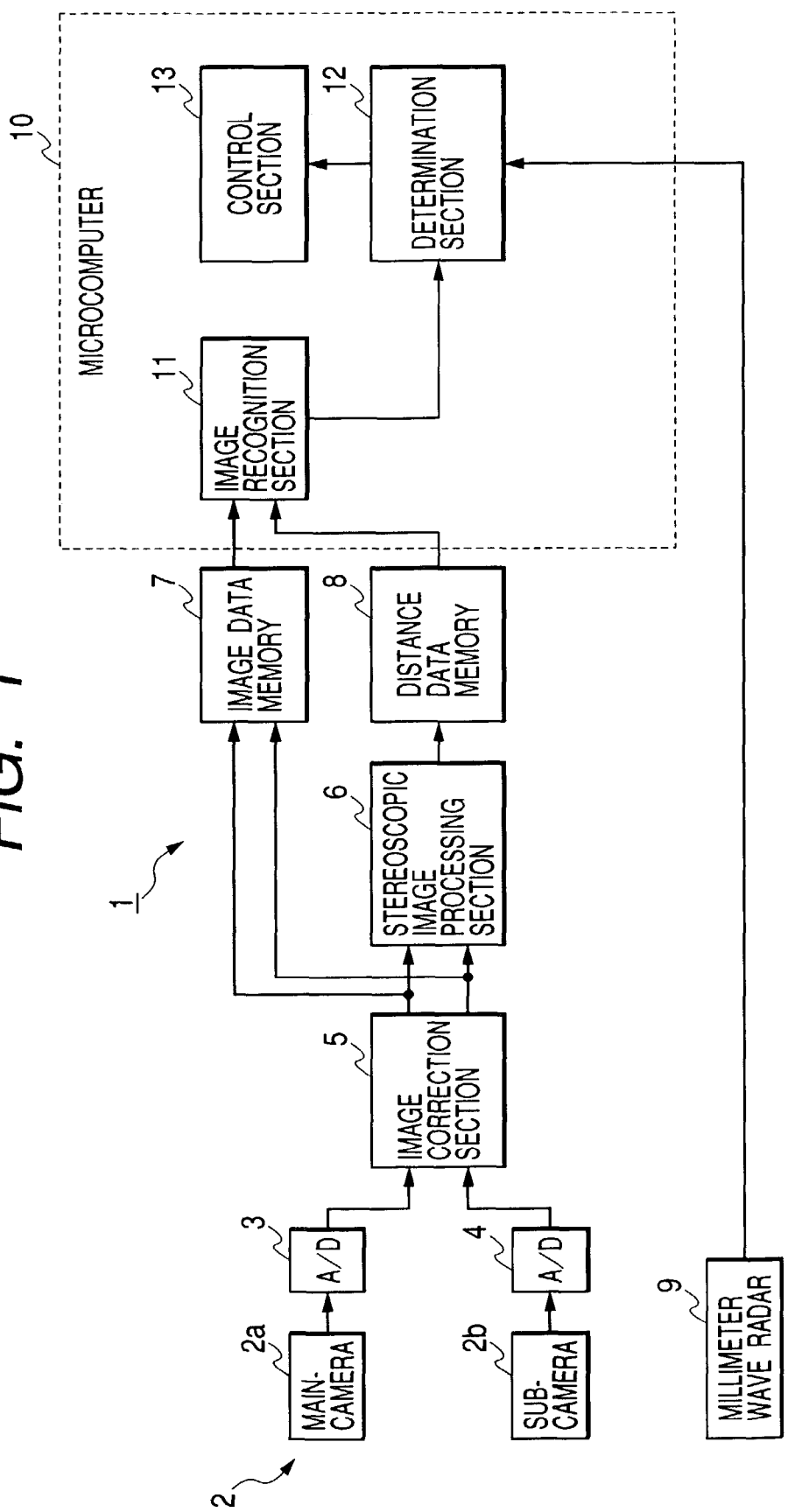
FIG. 1 is a block diagram of an identical object determination apparatus according to a first embodiment of the present invention.

FIG. 1 is a block diagram of an identical object determination apparatus according to a first embodiment of the present invention. An identical object determination apparatus 1 according to the embodiment functions as a part of a monitoring system for monitoring the running circumstances ahead of a vehicle by way of example. The monitoring system uses a plurality of sensors in combination, determines whether or not the objects detected by the sensors are identical, and recognizes the running circumstances based on the determination result and detection information provided by the sensors.

The monitor system has a sensor for detecting an object based on a pair of picked-up images using stereoscopic image processing as one of the sensors (in the embodiment, two sensors), which will be hereinafter referred to as first sensor S1. A stereoscopic camera 2 functioning as a part of the first sensor S1 is installed at a reference position, for example, in the proximity of a room mirror for picking up an image of the scene ahead of the vehicle. The stereoscopic camera 2 is made up of a pair of cameras 2a and 2b, each of which contains an image sensor (for example, a CCD, a CMOS sensor, or the like). The main camera 2a picks up a reference image (right image) required for performing stereoscopic image processing and the subcamera 2b picks up a comparison image (left image). Analog images output from the cameras 2a and 2b in a state in which they are synchronized with each other are converted by A/D converters 3 and 4 into digital images with a predetermined luminance gradation (for example, 256-level gray scale).

A pair of digitalized image data pieces is subjected to luminance correction, geometric conversion of the images, etc., in an image correction section 5. Usually, the installation positions of the pair of cameras 2a and 2b contain an error to one degree or another and thus a shift caused by the error occurs in the left and right images. To correct the shift, geometric conversion of rotation, parallel move, etc., of each image is performed using affine transformation, etc.

Through such image processing, reference image data is provided by the main camera 2a and comparison image data is provided by the subcamera 2b. The image data (stereoscopic image data) is a set of luminance values of pixels (0 to 255). Here, an image plane defined by the image data is represented by an i-j coordinate system with the lower-left corner of an image as the origin and the i coordinate axis in the horizontal direction and the j coordinate axis in the vertical direction. The image data corresponding to one frame (display unit of one image) is output to a stereoscopic image processing section 6 at the following stage and is stored in image data memory 7. An image recognition section 11 at the following stage reads the image data stored in the image data memory 7 whenever necessary and uses the image data for image recognition processing.

The stereoscopic image processing section 6 calculates distance data concerning the picked-up image corresponding to one frame based on the reference image data and the comparison image data. The "distance data" mentioned here is a set of parallaxes d calculated for each small area on the image plane defined by the image data, and the parallaxes d are related to positions on the image plane (i, j) in a one-to-one correspondence. One parallax d is calculated for each pixel block of a predetermined area forming a part of the reference image (for example, 4×4 pixels).

For example, if the reference image is made up of 200×512 pixels, as many parallaxes as the number of pixel blocks PBij (50×128) can be calculated. As known, the parallax d is the horizontal shift amount concerning the pixel block PBij of the calculation unit and has a large correlation with the distance to the object shown in the pixel block PBij. That is, as the object shown in the pixel block PBij is nearer to the camera 2a, 2b, the parallax d of the pixel block PBij becomes larger; as the object is farther from the camera, the parallax d becomes smaller (if the object is infinitely far from the camera, the parallax d becomes 0).

To calculate the parallax d concerning one pixel block PBij (correlation source), an area having a correlation with the luminance characteristic of the pixel block PBij (correlation destination) is determined in the comparison image. As described above, the distance from the camera 2a, 2b to the object appears as the horizontal shift amount between the reference image and the comparison image. Therefore, to search the comparison image for the correlation destination, a search may be made on the same horizontal line as the j coordinate of the pixel block PBij as the correlation source (Epipolar line). The stereoscopic image processing section 6 evaluates the correlation between coordinates for the correlation source and the correlation destination in order while shifting one pixel at a time on the epipola line in a predetermined search range set with the i coordinate of the correlation source as the reference (stereoscopic matching). The horizontal shift amount of the correlation destination determined having the highest correlation (any of the candidates for the correlation destination) is adopted as the parallax d of the pixel block PBij as a rule.

The correlation between two pixel blocks can be evaluated, for example, by calculating a city block distance CB. Formula 1 shows the basic form of the city block distance CB where p1$ij$ denotes the luminance value of the ijth pixel of one pixel block and p2$ij$ denotes the luminance value of the ijth pixel of the other. The city block distance CB is the sum total of the difference (absolute value) between the luminance values p1$ij$ and p2$ij$ corresponding to each other with respect to the position in the whole pixel block; the smaller the difference, the larger the correlation between the pixel blocks.

$$CB = \Sigma |p1ij - p2ij|$$ [Formula 1]

Basically, the pixel block having the minimum value of the city block distance CB calculated for each pixel block existing on the epipola line is determined the correlation destination. The shift amount between the correlation destination and the correlation source thus determined becomes the parallax d. JP-A-5-114099 discloses the hardware configuration of the stereoscopic image processing section 6 for calculating the city block distance CB. Refer to it if necessary. The distance data calculated through such processing, namely, a set of parallaxes d related to the positions on the image (i, j) is stored in distance data memory 8.

Figure 2:
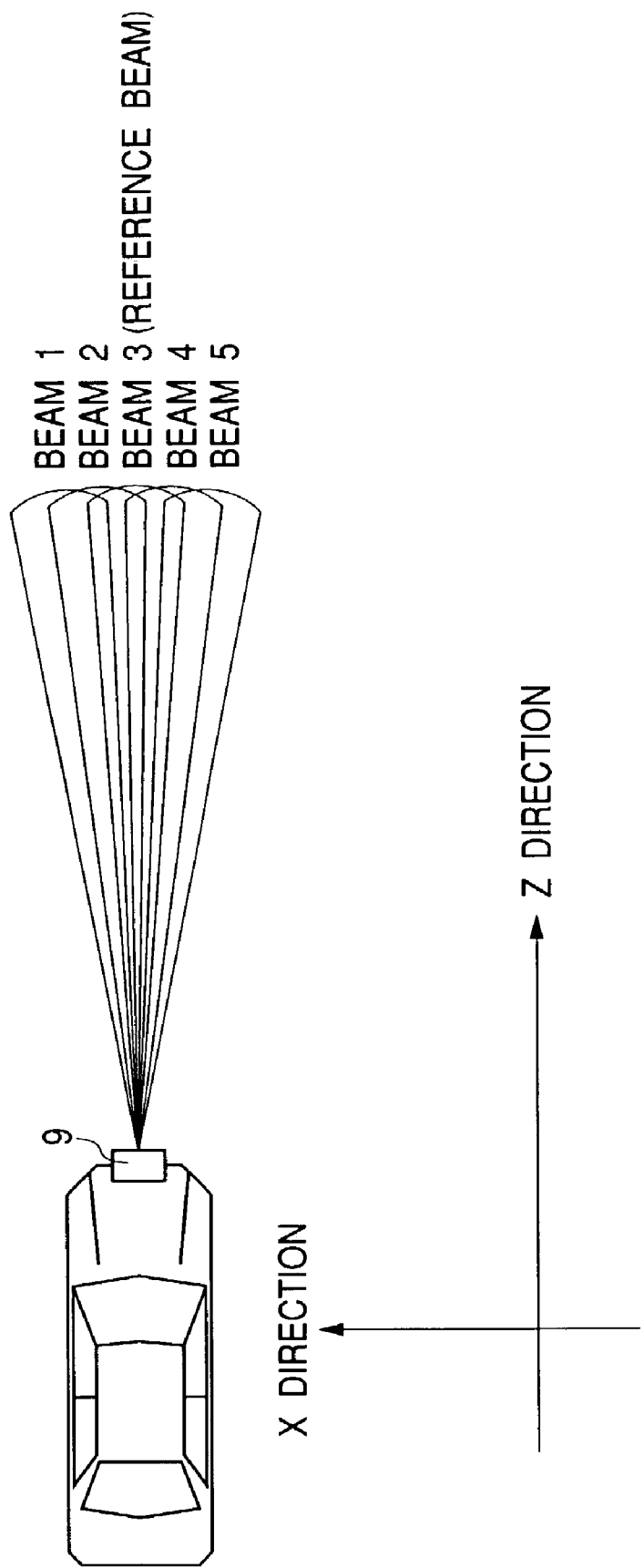
FIG. 2 is a schematic representation to show detection beams of a millimeter wave radar.

FIG. 2 is a schematic representation to show detection beams of a millimeter wave radar. The monitoring system according to the embodiment has a millimeter wave radar 9 as the other sensor, which will be hereinafter also referred to as second sensor S2. The millimeter wave radar 9 is attached to the reference position of the vehicle (for example, approximate center of front) so that the reference position of the millimeter wave radar 9 (radiation direction of reference beam) is matched with the vehicle length direction. The millimeter wave radar 9 radially transmits a plurality of millimeter wave beams ahead of the vehicle and receives reflected waves. At this time, the relative position of the object in the distance direction thereof, namely, the position in the z direction shown in FIG. 2, which will be hereinafter referred to as back and forth position z, is determined based on the time interval between beam transmission and reception. The relative position of the object in the angle direction thereof, namely, the position in the x direction shown in FIG. 2, which will be hereinafter referred to as side-to-side position x, is determined based on the transmission direction of each beam whose reflected wave is received. Further, relative speed vz of the object in the z direction is determined based on the Doppler principle. Relative speed vx of the object in the x direction is determined based on the side-to-side position x of the currently detected object and the side-to-side position x' of the object detected a predetermined time before (vx=(x−x')/predetermined time). The detection operation basically is performed in synchronization with the image pickup operation of the stereoscopic camera 2, and the object detected by the millimeter wave radar 9 (precisely, the position and speed defining the object) is output to a microcomputer 10. To provide the positional correspondence between the objects detected by the first sensor S1 and the millimeter wave radar 9 (namely, second sensor S2), preferably the x and z directions correspond to the coordinate system recognized by an image recognition section 11 (described later).

The microcomputer 10 is made up of a CPU, ROM, RAM, an input/output interface, etc.; it has the above-mentioned image recognition section 11, a determination section 12, and a control section 13 from the functional viewpoint.

The image recognition section 11 reads the distance data from the distance data memory 8 and uses a known coordinate conversion formula to calculate the position of the object in the real space based on the read distance data. The coordinate system of the real space set with the position of the own vehicle as the reference sets the vehicle width direction as the x axis, the vehicle height direction as the y direction, and the vehicle length direction (distance direction) as the z axis with the road face just below the center of the main camera 2$a$ as the origin. The relative position of the -object in the z axis direction (back and forth position z) and the relative position of the object in the x axis direction (side-to-side position x) are determined based on the position of the object calculated in the coordinate system. Further, relative speed of the object, namely, the relative speed vz in the z direction and the relative speed vx in the x direction are determined based on the position of the detected object and the position of the object detected a predetermined time before. The object detected by the first sensor S1 using the stereoscopic image processing (precisely, the position and speed defining the object) is output to the determination section 12.

The determination section 12 determines whether or not the objects detected by the sensors S1 and S2 are identical based on the positions and speeds of the objects, and identifies the identical object detected by the sensors. The determination section 12 outputs the positions and speeds of the objects detected by the sensors and further a combination of the objects detected by the sensors and identified as the identical object to the control section 13.

The control section 13 uses the output result from the determination section 12 to recognize and monitor the circumstances ahead of the vehicle based on the information concerning the object detected by the sensors, and controls warning devices, a controller, etc., (not shown) as required. For example, in the running circumstances where the distance to the preceding vehicle becomes short and a warning given to the driver is required, warning devices of a monitor, a loudspeaker, etc., are operated for calling attention to the driver. To decelerate the vehicle under such circumstances, brake operation, automatic shifting to lower gear, lowering of engine output, etc., is performed.

Figure 3:
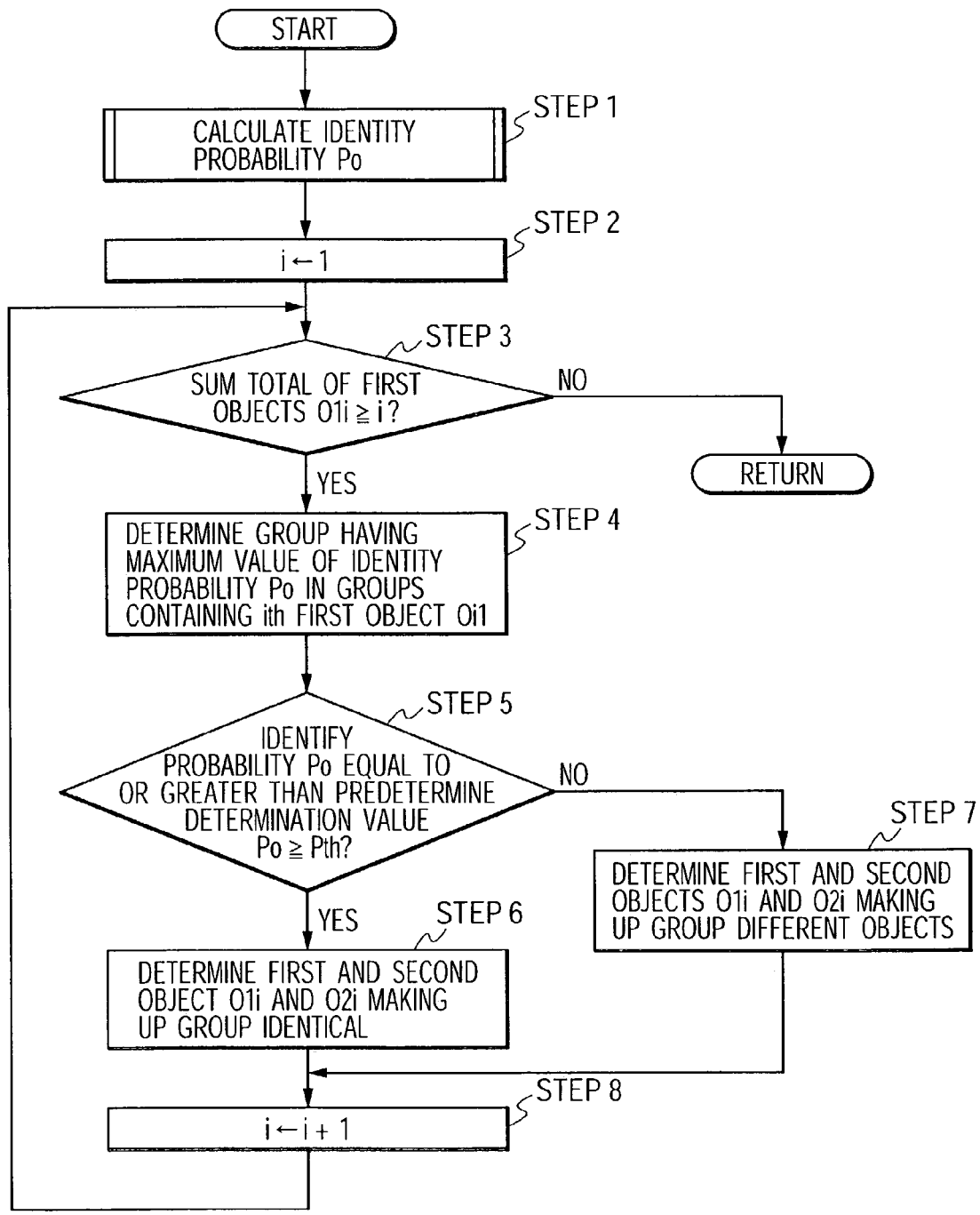
FIG. 3 is a flowchart to show a determination procedure of an identical object according to the first embodiment of the present invention.

FIG. 3 is a flowchart to show a determination procedure of an identical object according to the first embodiment of the present invention. This routine is called at predetermined time intervals and is executed by the microcomputer 10. First, at step 1, the determination section 12 calculates identity probability Po as the probability that the objects detected by the sensors S1 and S2 are identical. In the embodiment, each of first objects O1$i$ detected by the first sensor S1 and each of second objects O2$i$ detected by the second sensor S2 are objects to be processed and the identity probability Po is calculated for all combinations of the detected objects O1$i$ and O2$i$.

Figure 4:
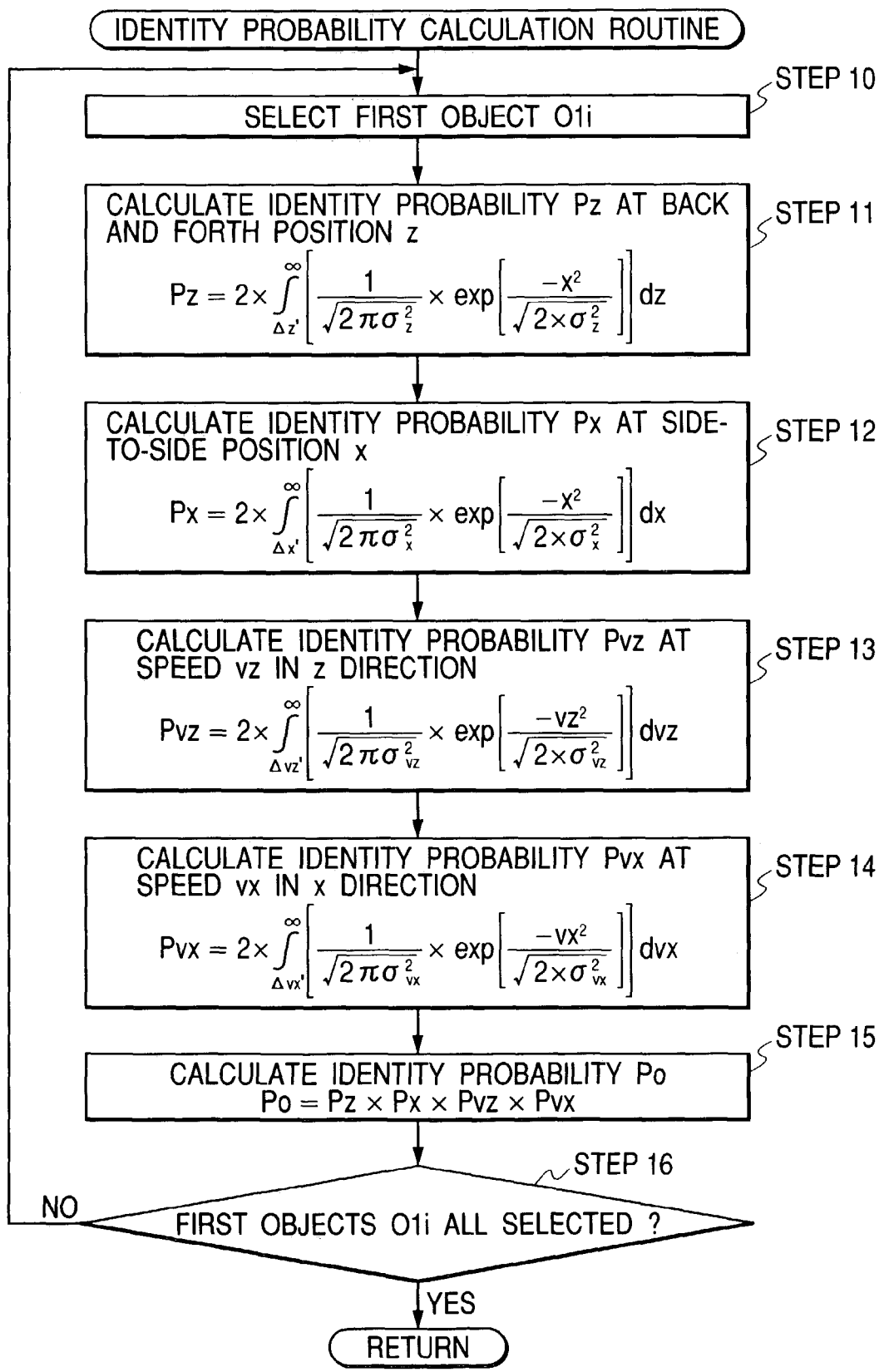
FIG. 4 is a flowchart to show details of an identity probability calculation routine.

FIG. 4 is a flowchart to show details of the identity probability calculation routine at step 1. First, at step 10, one first object O1$i$ is selected from among the first objects O1$i$ detected by the first sensor S1.

At step 11, identity probability Pz is calculated as the probability that the selected first object O1$i$ and one second object O2$i$ are identical at the back and forth position z. If a plurality of second objects O2$i$ are detected, each of the second objects O2$i$ is paired with the selected first object O1$i$ one by one and the identity probability Pz is calculated for each of the pairs. In the description that follows, the pair of the first object O1$i$ and the second object O2$i$ may be referred to simply as "group."

A calculation technique of the identity probability Pz will be discussed. If the back and forth position z of an object is measured by the two sensors S1 and S2, back and forth positions z1 and z2 detected by both the sensors S1 and S2 contain each a measurement error and thus the value changes to some extent each time measurement is conducted. The embodiment assumes that the back and forth positions z1 and z2 of the measurement values are random variables following a normal distribution. Under this assumption, the back and forth positions z1 and z2 follow the normal distribution of average values m1 and m2 and standard deviations σ1 and σ2. At this time, the difference between the back and forth positions z1 and z2, Δz=z1−z2, becomes normal distribution of average value m1−m2 and standard deviation $\sqrt{(\sigma 1^2)+(\sigma 2^2)}$ from the reproducibility of the normal distribution.

Here, assume that when measurement on the back and forth position z of one object is conducted by the first and second sensors S1 and S2, the difference between the back and forth positions z1 and z2 is determined Δz'. At this time, the hypothesis that "the objects detected by the first and second sensors S1 and S2 are identical" is set up, and a method of testing the hypothesis is considered.

Figure 5:
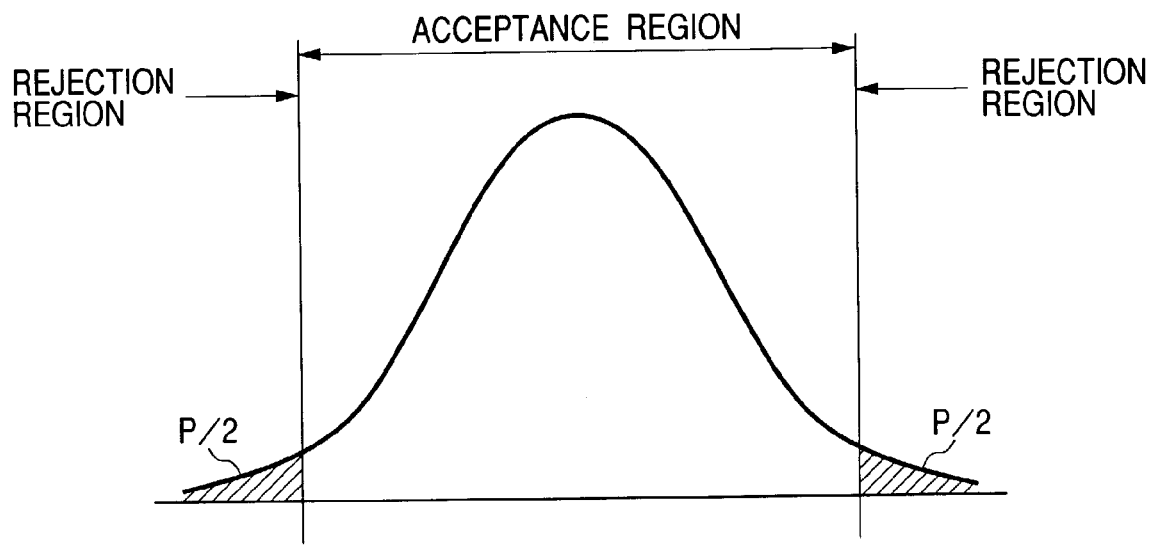
FIG. 5 is a schematic representation to show definition of an acceptance region and a rejection region in statistical hypothesis testing.
Figure 6:
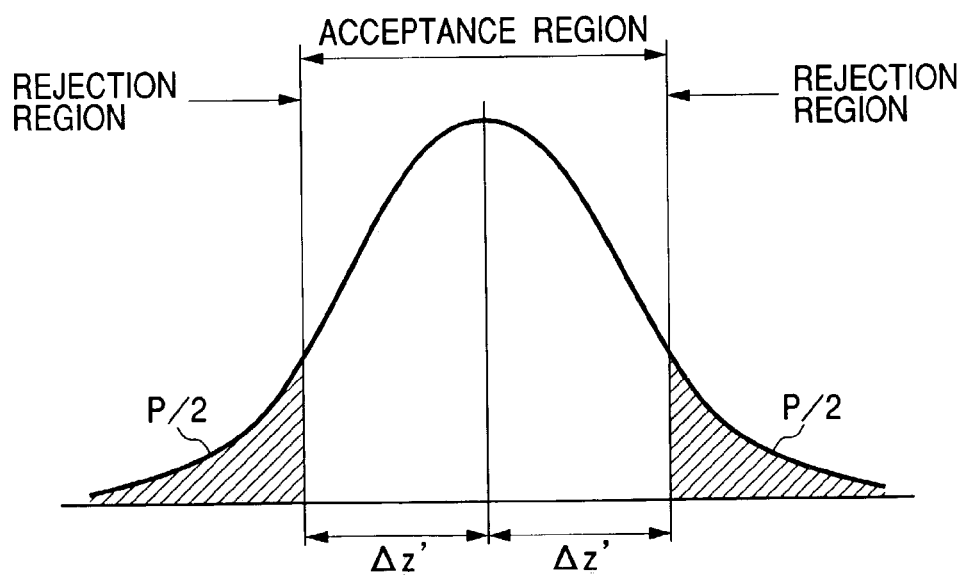
FIG. 6 is a schematic representation to show the maximum significance level where an error becomes "true;"

If a pair of sensors S1 and S2 detect the identical object, essentially m1=m2 and the difference Δz follows the normal distribution of average value 0 and standard deviation $\sqrt{(\sigma 1^2)+(\sigma 2^2)}$. FIG. 5 is a schematic representation to show definition of an acceptance region and a rejection region in statistical hypothesis testing. In statistics, generally an acceptance region and a rejection region for hypothesis testing are set on the normal distribution for evaluating the hypothesis. Area P on the normal distribution hatched in FIG. 5 is called significance level and corresponds to the probability that the hypothesis is true. In the normal distribution concerning the error Δz (namely, assuming that the objects are identical, the difference Δz corresponds to an error), when determined error Δz' exists in the acceptance region in the figure, the hypothesis is determined true. On the other hand, when the error Δz' exists in the rejection region, the hypothesis is determined false By the way, if the error Δz' is obtained, the maximum significance level where the error Δz' becomes true, namely, the hypothesis that "the objects are identical" becomes true is set to regions hatched in FIG. 6. Specifically, the significance level is set to regions outside the error Δz', namely, regions occupied by errors larger than the error Δz'. The area P at this time can be uniquely calculated from the determined error Δz' based on the normal distribution concerning the error Δz. The significance level indicates the height of the probability that the hypothesis is true, in other words, the probability that the objects detected by the sensors S1 and S2 are identical depending on the size of the area P.

Finding the maximum significance level where the error Δz' becomes true from the error Δz' between the back and forth positions z1, z2 of the objects detected by the sensors S1 and S2 is equivalent to finding the probability that the objects are identical. For example, if Δz' is small, the significance level area P becomes large and the identity probability Pz also becomes high accordingly. At this time, the back and forth positions z1 and z2 of the objects detected by both the sensors S1 and S2 are approximate to each other, matching the possibility that the detected objects are identical, namely, the fact that the identity probability Pz is high.

On the assumption, the identity probability Pz is calculated based on the following formula 2:

$$Pz = 2 \times \int_{\Delta z'}^{\infty} \left[ \frac{1}{\sqrt{2\pi\sigma_z^2}} \times \exp\left[\frac{-z^2}{2\times\sigma_z^2}\right] \right] dz \qquad \text{[Formula 2]}$$

where $\sigma_z = \sqrt{\sigma_{z1}^2 + \sigma_{z2}^2}$

Here, $\sigma_{z1}$ denotes standard deviation of distance z1 of the first sensor S1, $\sigma_{z2}$ denotes standard deviation of distance z2 of the second sensor S2, and Δz denotes the difference between the distance z1 of the first sensor S1 and the distance z2 of the second sensor S2. Both standard deviations $\sigma_{z1}$ and $\sigma_{z2}$ can be set to proper values whenever necessary.

The formula means calculating of the probability that the detected objects O1 and O2 are identical at the back and forth direction from the error Δz' between the back and forth positions determined based on the normal distribution concerning the error Δz between the back and forth positions z when the sensors S1 and S2 detect the identical object.

Referring again to FIG. 4, at step 12, as the probability that the selected first object O1$i$ and the second object O2$i$ are identical at the side-to-side position x, identity probability Px is calculated for each group. As at step 11, the identity probability Px is uniquely calculated from error Δx' between side-to-side positions x1 and x2 of the first and second objects O1$i$ and O2$i$ based on the normal distribution concerning error Δx between side-to-side positions x when the sensors S1 and S2 detect the identical object. As steps 11 and 12 are executed, the identify probabilities Pz and Px are calculated as the probability that the first and second objects O1$i$ and O2$i$ detected are identical with respect to the position.

Next, as the probability that the selected first object O1$i$ and the second object O2$i$ are identical at the speed vz in the z direction, identity probability Pvz is calculated for each group (step 13). As the probability that the selected first object O1$i$ and the second object O2$i$ are identical at the speed vx in the x direction, identity probability Pvx is calculated for each group (step 14). That is, as steps 13 and 14 are executed, the identify probabilities Pvz and Pvx are calculated as the probability that the detected objects are identical with respect to the speed.

At step 15 following step 14, the identity probability Po is calculated as the probability that the first and second objects O1$i$ and O2$i$ are identical based on the identify probabilities Pz and Px concerning the position and the identify probabilities Pvz and Pvx concerning the speed. The identity probability Po is calculated uniquely based on the following formula 3. At step 15, the identity probability Po is calculated for each group.

$$Po = Pz \times Px \times Pvz \times Pvx \qquad \text{[Formula 3]}$$

As understood from formula 3, the identity probability Po is the product of the identify probabilities Pz, Px, Pvz, and Pvx concerning the position and the speed found at steps 11 to 14. Therefore, the identity probability Po contains not only the probability that the first and second objects O1i and O2i are identical with respect to the position, but also the probability that the objects are identical with respect to the speed as the probability that the objects are identical. The identity probability Po is found quantitatively as one value. Therefore, the calculated identity probability Po makes it possible to determine whether or not the objects detected by the sensors S1 and S2 are identical totally from the viewpoints of the position and the speed. For example, objects largely different in relative speed although the blocks are approximate to each other with respect to the position (or objects largely different in position although the blocks are approximate to each other with respect to the speed) are clearly distinguished from each other because they are reflected quantitatively as the identity probability Po.

At step 16, whether or not the first objects O1i detected by the first sensor S1 are all selected is determined. If it is determined that the first objects O1i detected are all selected (YES at step 16), the routine is exited. On the other hand, if it is determined that an unselected first object O1i remains (NO at step 16), the unselected first object O1i is selected and the above-described process is repeated.

Referring again to FIG. 3, at step 2, 1 is set as a variable i for identifying each of the first objects O1i detected by the first sensor S1 involved in the stereoscopic image processing to use the object detected by one sensor as the reference. For example, if the first objects O1i shown on the image plane are labeled starting at 1 in the ascending order from left to right, the first object O1i shown at the leftmost position on the image plane is identified at step 2.

At step 3, whether or not the sum total of the first objects O1i detected by the first sensor S1 is the variable i or more is determined. If it is determined that the sum total is the variable i or more, control goes to step 4.

At step 4 following the step 3, the group having the maximum value of the identity probability Po calculated concerning the groups containing the reference object, namely, the i th first object Oi1 is determined. As described above, the identity probability Po that the first and second objects O1i and O2i are identical is found for all combinations of the first and second objects O1i and O2i detected. Then, as step 4 is executed, the second object O2i in the combination providing the maximum identity probability Po with respect to the i th first object Oi1 is determined.

At step 5, whether or not the identity probability Po calculated for the determined group exceeds a predetermined determination value Pth is determined. The predetermined determination value Pth is determined as a value to an extent to which the objects detected by the sensors S1 and S2 are assumed to be identical with respect to the position and the speed (probability value). If it is determined at step 5 that the identity probability Po exceeds the predetermined determination value Pth, it is determined that the probability that the determined group includes the identical object with respect to the position and the speed is high, and the first and second objects O1i and O2i making up the group are determined identical (step 6) On the other hand, if it is not determined at step 5 that the identity probability Po exceeds the predetermined determination value Pth, it is determined that the probability that the determined group includes the identical object with respect to the position and the speed or with respect to the position or the speed is low. The first and second objects O1i and O2i making up the group are determined different objects (step 7).

At step 8 following step 6 or 7, the variable i is incremented by one (i+1), and the described process is repeated as many times as the number of the first objects O1i detected by the first sensor S1. Accordingly, whether or not the objects are identical is determined for all combinations of the first and second objects O1i and O2i.

On the other hand, if it is not determined at step 3 that the sum total is the variable i or more, the routine is exited. At this time, the determination section 12 outputs the position and speed of each of the first objects O1i detected by the first sensor S1 and the position and speed of each of the second objects O2i detected by the second sensor S2 to the control section 13. Further, the determination section 12 outputs the group detected by the first and second sensors S1 and S2 and determined the identical object together with the identity probability Po concerning the group to the control section 13, which then uses the output result to recognize and monitor the circumstances ahead of the vehicle based on the information concerning the identical object detected by the sensors S1 and S2 or the object detected only by either the sensor S1 or S2.

As described above, in the first embodiment, whether or not the objects detected by the sensors are identical is determined using both the position and the speed. Accordingly, if the objects are approximate to each other with respect to either element of the position and the speed, the other element is further considered, so that whether or not the detected objects are identical can be accurately determined. In the first embodiment, the match degree between the object detected by one sensor and that detected by the other sensor can be evaluated quantitatively as the identity probability. Since the identity probability is calculated on the normal distribution concerning measurement value errors, the standard deviation concerning the normal distribution can also be arbitrarily changed for changing the validity of the determination appropriately. Further, the identical object detected by the sensors can be recognized accurately, so that the object detected only by one sensor can also be grasped accurately. Accordingly, in the first embodiment, the recognition accuracy can be improved still more as compared with the case where a plurality of sensors are used in combination simply as a monitoring system.

In the first embodiment, the object detected by one sensor is used as the reference and the group having the maximum value of the identity probability Po is determined in the groups each containing the reference object (step 4) and the subsequent process is executed. However, in each group containing the reference object, it is also possible that the identity probability Po becomes the predetermined determination value Pth or more in two or more groups. For example, if two detection results are provided for one object because of detecting the reflector of a vehicle as with a laser radar, such an event can occur. Therefore, if the group having the maximum value of the identity probability Po is only determined, there is a possibility that determination will not be made for all groups containing the objects.

Here, assuming that there are two groups exceeding the predetermined determination value Pth, the groups are named first and second groups. At this time, preferably the determination section 12 performs the following processing: Specifically, each of the identity probability Po calculated concerning the first group and the identity probability Po calculated concerning the second group is compared with a determination value Pth' greater than the predetermined determination value Pth. If the identity probabilities Po calculated concerning the first and second groups exceed each the determination value Pth', the objects making up the first and second groups are determined identical. On the other hand, either or both of the identity probability Po calculated concerning the first group and the identity probability Po calculated concerning the second group may not exceed the determination value Pth'. In this case, the objects making up the group having the identity probability Po exceeding the determination value Pth' may be determined identical. In doing so, the determination as to whether or not the objects are identical can be made more effectively.

In the first embodiment, the sensor for detecting the object based on a pair of picked-up images using stereoscopic image processing and the millimeter wave radar 9 are used as the sensors. However, a sensor, such as a laser radar, can also be used in place of either of the sensors. The laser radar can detect the position of an object, but cannot detect the speed. However, like the first sensor described above, the laser radar can determine the relative speed concerning the object based on the position of the detected object and the position of the object detected a predetermined time before. Thus, in the present invention, it is to be understood that not only determining the position of the object, but also determining the relative speed based on the position of the object detected a predetermined time before is contained as one function of the sensor.

In the embodiment, the two sensors are used in combination; three or more sensors can also be used in combination. To use three or more sensors in combination, whether or not the objects detected by the sensors are identical can be determined according to a similar procedure to that in the embodiment described above, for example, in such a manner that if the identity probability Po calculated concerning the objects detected by the three or more sensors is equal to or greater than the predetermined determination value Pth, the objects detected by the sensors are assumed to be identical.

To thus use a plurality of sensors, at least one of the sensors may detect a plurality of objects. In such a case, preferably whether or not the objects are identical is determined for all (or any) combinations of the objects detected by the sensors as in the routines previously described with reference to FIGS. 3 and 4.

Specifically, for each sensor, one object is selected from among the detected objects, whereby groups are formed as different combinations. For each group, the identify probabilities Pz and Px with respect to the position and the identify probabilities Pvz and Pvx with respect to the speed are calculated. For each group, the identity probability Po is calculated as the probability that the objects making up the group are identical based on the calculated identify probabilities Pz and Px with respect to the position and the calculated identify probabilities Pvz and Pvx with respect to the speed. Next, the object detected by one sensor is adopted as the reference and the group having the maximum value of the identity probability Po calculated for the group containing the reference object is determined. If the identity probability Po calculated for the determined group exceeds the predetermined determination value Pth, the objects making up the determined group are determined identical. To accurately determine whether or not the objects are identical, preferably whether or not the objects are identical is determined for all (or any) combinations of the objects detected by the sensors.

To use three or more sensors, the determination section 12 may contain the following function: Specifically, if the determined identity probability Po is smaller than the predetermined determination value Pth, the determination section 12 extracts the objects in any combination from the detected objects. Accordingly, for example, two objects detected by the two sensors are extracted from the objects detected by the three or more sensors. Processing is performed for the extracted objects to calculate the identity probability Po. At this time, if the calculated identity probability Po exceeds the predetermined determination value Pth, the extracted objects are determined identical. According to the function, the objects detected by the majority of the three or more sensors may be assumed to be identical (namely, it is not necessary to detect the objects by all sensors).

To thus use three or more sensors in combination, it is also possible to use the sensors properly in response to the circumstances in such a manner that since the detection accuracy of a laser radar is degraded by heavy fog, for example, as compared with the normal state, detection information from the laser radar is rejected or in such a manner that information from a millimeter wave radar is rejected if the resolution is given a higher priority. Only the sensors having good characteristics are used properly in response to the circumstances, whereby the object can be detected more effectively.

In the identical object determination technique shown in the first embodiment, the information handled in the past processing, namely, history information can also be used. The most of the history information is made for identical object determination, whereby the identical object determination can be made more accurately. As a precondition for performing the processing, several pieces of information need to be retained as history information. As the history information, for example, the following three can be named:

(1) history information indicating that the object detected by one sensor is determined identical with which of the objects detected by any other sensor in the preceding processing;

(2) history information indicating the number of successive times that the object detected by one sensor has been determined identical with the object detected by any other sensor in the past processing; and (3) history information indicating the identify probability Po of the object detected by one sensor and the object detected by any other sensor.

The identical object determination processing using the information is as follows: First, as one example, a correction is made so as to enhance the identify probability Po of the group determined identical also in the preceding processing as much as a predetermined probability using the information in (1) in addition to the identical object determination technique. Further, a correction may be made so as to enhance the identify probability Po of the group determined identical furthermore as much as a predetermined probability in response to the number of successive times that the objects have been determined identical using the information in (2) in addition to the technique using the information in (1). As another example, data correction of the identify probability Po calculated this time, for example, smoothing is performed based on the identify probability Po calculated in the preceding processing using the information in (3) in addition to the identical object determination technique. The history information is thus used to enhance the identify probability of the group determined identical in the past processing, whereby the identical object determination accuracy can be more enhanced. As the history information is thus used, if a temporary error occurs, the possibility that an error will occur in the identical object determination can be decreased.

Figure 7:
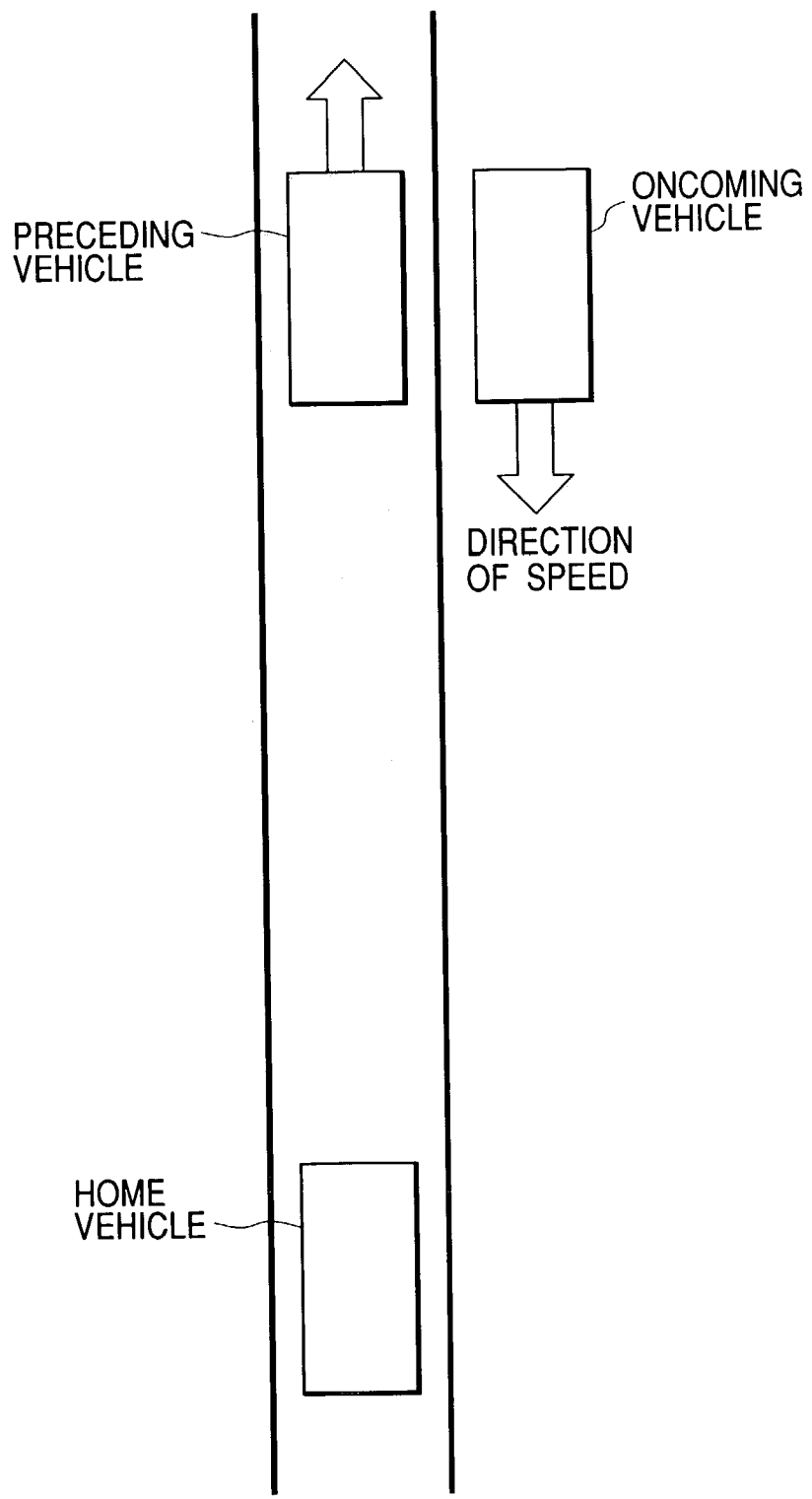
FIG. 7 is a schematic representation to show separation of objects.

In the embodiment, the probability Po that the objects detected by the sensors are identical is calculated and whether or not the objects are identical is determined quantitatively, but the present invention is not limited to it if the technique is a technique using position information and speed information as determination elements. As another technique example, the following technique is possible: First, the relative position and the relative speed of each of the detected objects are determined. An error of the position of the detected object is determined based on the determined position, and the determined position error is compared with a first determination value. At this time, further an error of the speed of the detected object is determined based on the determined speed, and the determined speed error is compared with a second determination value. Accordingly, the detected objects are separated into the identical object and different objects in such a manner that, for example, if the determined position error is smaller than the first determination value and the determined speed error is smaller than the second determination value, the corresponding detected objects are determined identical. Such a technique would make it possible to detect the identical object effectively on the condition that the objects match in position and further match in speed. For example, as shown in FIG. 7, the preceding vehicle running ahead of the own vehicle and the oncoming vehicle passing the preceding vehicle can be separated accurately for recognition.

(Second Embodiment)

Figure 8:
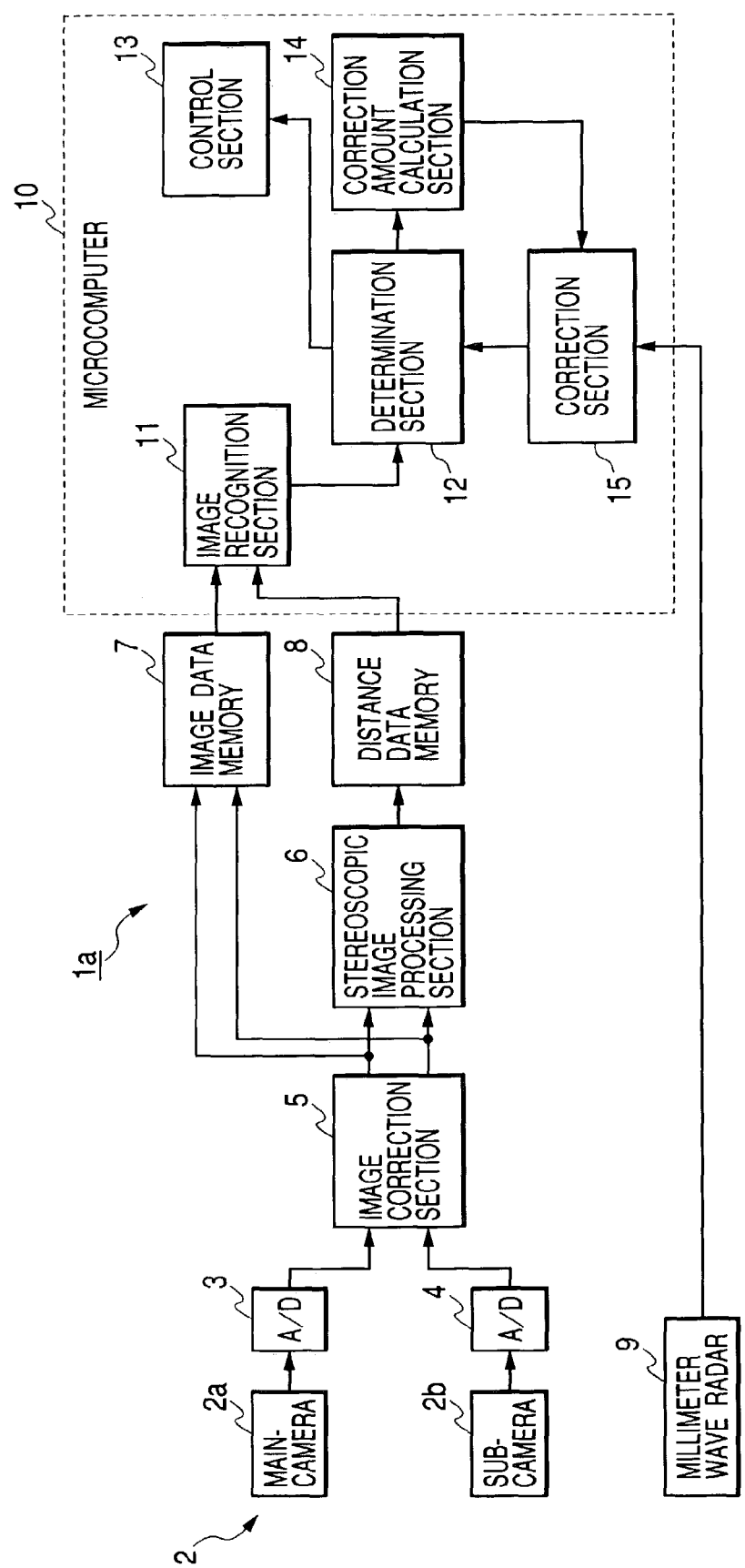
FIG. 8 is a block diagram of a displacement correction apparatus according to a second embodiment of the present invention.

FIG. 8 is a block diagram of a displacement correction apparatus according to a second embodiment of the present invention. A displacement correction apparatus 1a according to the embodiment functions as a part of a monitoring system for monitoring the running circumstances ahead of a vehicle by way of example. The monitoring system uses a plurality of sensors, detects objects as the sensors collaborate, and recognizes the running circumstances based on the detection information. Further, the monitoring system corrects displacement of the identical objects detected by one sensor and any other sensor as the function of the displacement correction apparatus 1a. Components identical with those previously described with reference to FIG. 1 in the first embodiment are denoted by the same reference numerals in FIG. 8 and will not be discussed again in detail.

The second embodiment differs from the first embodiment in that displacement of the identical objects detected by the sensors is corrected. The possible cause of such displacement is a sensor attachment error, for example. Usually, the sensors used with the monitoring system are attached to predetermined reference positions with good accuracy to provide the positional correspondence between the detected objects. However, as the sensors are used, the sensor attachment state may differ from the essential state, namely, a state shifting from the reference positions with change over time, for example. As an example of a shift from the reference position, a shift of the image pick-up direction of a stereoscopic camera 2 or the emission direction of a reference beam of a millimeter wave radar 9 from the vehicle length direction or a positional shift of each sensor in the back and forth direction or the side to side direction thereof can be named. If the sensors detect the identical object in such a state, any of the shifts causes a relative shift, namely, displacement to occur in the positions of the objects detected by the sensors. Consequently, there is a possibility that the detected objects will be determined different. Occurring of such a phenomenon is not preferred although a plurality of sensors are used to enhance the detection accuracy.

Then, in the second embodiment, to correct the displacement, the displacement correction apparatus further includes a correction amount calculation section 14 and a correction section 15 as functional elements of a microcomputer 10 in addition to the components of the apparatus of the first embodiment. In the description that follows, it is assumed that displacement of the identical objects detected by the sensors is caused by relative shift $\theta t$ of the sensors in the angle direction thereof.

The correction amount calculation section 14 sets correction parameters $\delta$ for correcting relative displacement of the identical objects detected by a first sensor S1 involved in stereoscopic image processing and a second sensor S2 of a millimeter wave radar 9. In the embodiment, the correction amount calculation section 14 sets two correction parameters $\delta$ of a first correction parameter $\delta 1$ and a second correction parameter $\delta 2$ by way of example. Assuming that displacement of the identical objects is caused by relative shift of the sensors in the angle direction thereof, the correction parameter $\delta$ makes it possible to make a correction so as to relatively rotate the position of the detected object by shift $\theta$ amount. The setup correction parameter $\delta$ is output to the correction section 15, which then relatively corrects the position of the object detected by the sensor based on the correction parameter $\delta$. In the embodiment, as shown in FIG. 8, the correction section 15 makes this correction on the object detected by the second sensor S2. Accordingly, position information concerning each second object O2$i$ corrected becomes equivalent to position information when the second sensor S2 detects the object in a state in which it shifts relatively by angle $\theta$ from the current attachment state.

The position information of the object whose position is relatively corrected based on the correction parameter $\delta$ and speed information of the object are output to a determination section 12, which then determines whether or not the objects detected by the sensors S1 and S2 are identical. The correction amount calculation section 14 compares the determination results and determines the correction parameter $\delta$ determined corresponding to the identical object having the higher identity probability Po. A feedback correction parameter $\delta am$ for making feedback correction of relative displacement of the objects detected by the sensors is determined based on the determined correction parameter $\delta$. The determined feedback correction parameter $\delta am$ is output to the correction section 15, and the position of each object detected by the second sensor is always subjected to correction corresponding to the feedback correction parameter $\delta am$.

Figure 9:
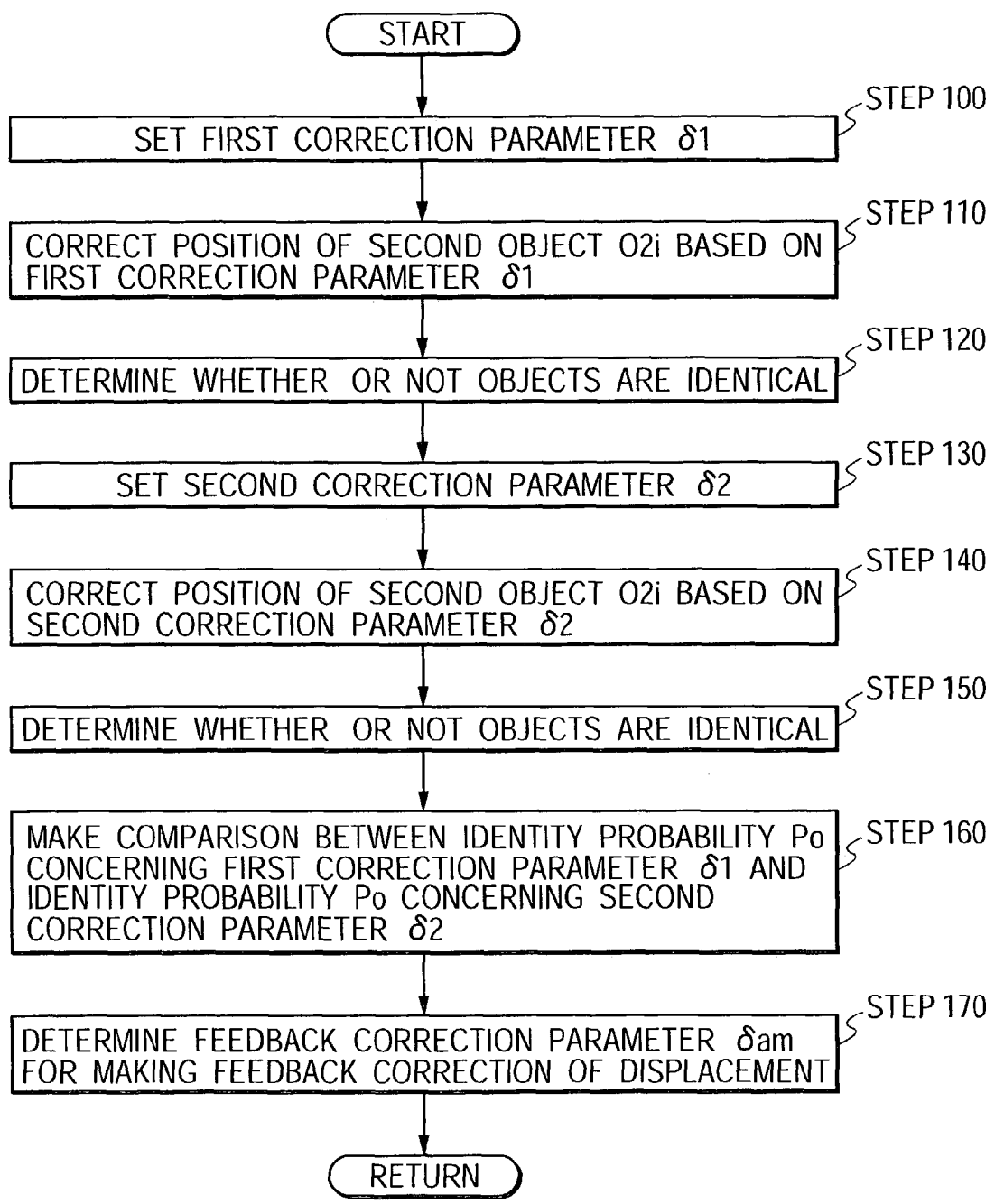
FIG. 9 is a flowchart to show a displacement correction procedure according to the second embodiment of the present invention.

FIG. 9 is a flowchart to show a displacement correction procedure according to the second embodiment of the present invention. To begin with, at step 100, the correction amount calculation section 14 sets a first correction parameter $\delta 1$ for correcting relative displacement of the position of the object detected by the first sensor S1 and the position of the object detected by the second sensor S2. The correction section corrects the position of each of the second objects O2$i$ detected by the second sensor S2 based on the setup first correction parameter $\delta 1$ (step 110).

At step 120, the determination section 12 determines whether or not each of first objects O1$i$ and each of the second objects O2$i$ whose positions are corrected based on the first correction parameter $\delta 1$ are identical. As in the first embodiment, if the detected objects are determined identical, the determination section 12 determines the combination of the objects recognized to be identical and quantitatively calculates identity probability Po as the probability that the combination includes the identical object.

At step 130, the correction amount calculation section 14 sets a second correction parameter $\delta 2$ for correcting relative displacement of the position of the object detected by the first sensor S1 and the position of the object detected by the second sensor S2 (not equal to the first correction parameter δ1). The correction section 15 corrects the position of each of the second objects O2i detected by the second sensor S2 based on the setup second correction parameter δ2 (step 140).

At step S150, the determination section 12 determines whether or not each of the first objects O1i and each of the second objects O2i whose positions are corrected based on the second correction parameter δ2 are identical. If the detected objects are determined identical, the determination section 12 determines the combination of the objects recognized to be identical and quantitatively calculates the identity probability Po as the probability that the combination includes the identical object as at step 120.

At step 160, the correction amount calculation section 14 determines which of the first correction parameter δ1 and the second correction parameter δ2 is the valid correction parameter δ. Specifically, a comparison is made between the identity probability Po calculated with the relative position corrected based on the first correction parameter δ1 and the identity probability Po calculated with the relative position corrected based on the second correction parameter δ2 in such a manner that the average value or the sum total of the calculated probabilities Po is found for each of the correction parameters δ1 and δ2 and the found average values or sum totals are used to make a comparison between the identity probabilities Po, for example. The correction parameter δ1 or δ2 corresponding to the identity probability Po determined higher (namely, corresponding to the identical object having the higher identity probability Po) based on the comparison is determined the valid correction parameter δ.

At step 170, a feedback correction parameter δam for making feedback correction of relative displacement of the identical objects detected by the sensors is determined based on the determined correction parameter δ. In the embodiment, to provide stability of control, the following processing is performed without using the determined correction parameter δ remained intact as the feedback correction parameter δam: Specifically, first the difference between the current value of the feedback correction parameter δam and the value of the correction parameter δ determined at step 160 is calculated as shift amount Δδ. The shift amount Δδ is multiplied by a proportionality constant (0<k<1) and the result is added to the current value of the feedback correction parameter δam for updating the value of the feedback correction parameter δam. The updated feedback correction parameter δam is output to the correction section 15. Execution of the routine described with reference to the flowchart is now complete.

As described above, according to the second embodiment, the correction parameter δ is set and whether or not the correction parameter δ is valid is determined based on the identify degree of the objects. That is, the correction parameter δ for correcting displacement seeming to actually occur is set hypothetically and the validity of the correction parameter δ is evaluated by finding the match degree of the identical objects (namely, identity probability Po). Accordingly, the correction parameter δ determined valid is used to correct the positions of the detected objects, whereby displacement of the identical objects detected by a plurality of sensors can be corrected effectively. Since the correction parameter δ can be set appropriately, registration can be corrected effectively even in the circumstances where the shift amount becomes large and the objects which should be identical are not recognized to be identical.

Figure 10B:
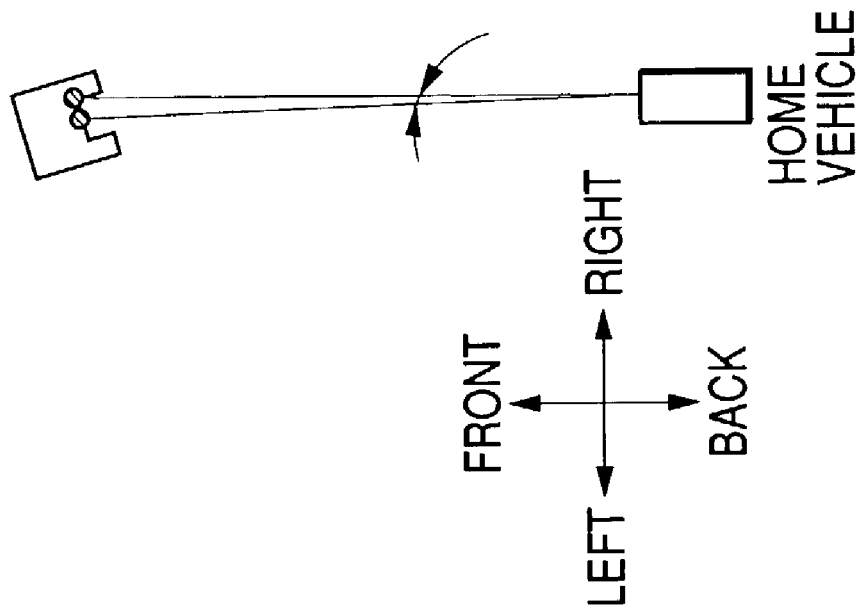
FIGS. 10A and 10B are schematic representations to show the relationship between the object position and an error.
Figure 10A:
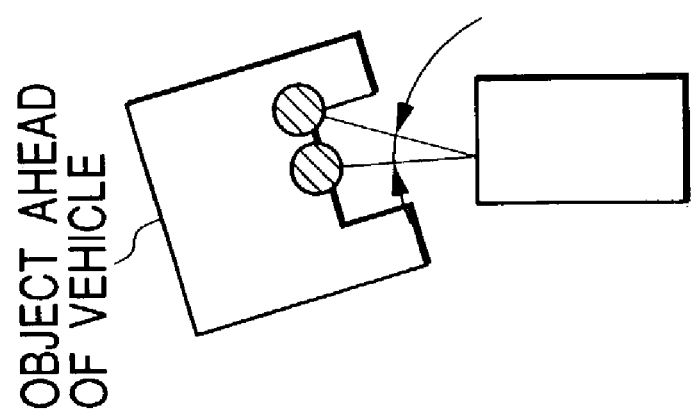

If an object and a sensor are near to each other (see FIG. 10A), registration is largely reflected because of the detection position difference as compared with the case where an object and a sensor are distant from each other (see FIG. 10B). Thus, there is a possibility that the position of the detected object may contain an error more than the attachment angle error. Then, in the embodiment, when the determination results are compared at steps 120 and 150, preferably only the determination result concerning the object more distant from the predetermined determination value with respect to the position is used. Accordingly, only the identity probability Po with a smaller error is used to perform processing, so that displacement can be corrected precisely.

The relative shift between the first sensor S1 and the second sensor S2 is not limited to the angle direction shift and may be assumed to be shift in the back and forth or side to side direction for performing the described processing.

In the second embodiment, it is assumed in the description that displacement of the detected objects is caused by the sensor attachment error, but the present invention is not limited to it. For example, relative displacement between the identical objects caused by an error of distance measurement accuracy of sensor can also be corrected according to a similar technique. For example, the correction amount calculation section 14 sets the correction parameter based on a relative detection position error between one sensor and another sensor, whereby displacement caused by the detection error can be corrected.

In the second embodiment, the two correction parameters δ are set and either of the correction parameters δ determined valid is adopted as the feedback correction parameter δam, but the number of correction parameters δ initially set maybe more than two.

If three or more correction parameters δ are thus set, to determine the valid correction parameter δ, it is necessary to determine whether or not the objects are identical with respect to all the correction parameters δ and evaluate the determination results. However, to perform such processing, the processing load increases and the processing time is prolonged. Then, to thus set three or more correction parameters δ, preferably the correction parameters δ are classified into several groups and the above-described processing is performed with respect to only the correction parameters δ belonging to one group in one process. Accordingly, the processing time of determining whether or not the objects are identical, etc., in one process can be shortened. As the correction-parameters δ selected for each group are further compared, the valid correction parameter δ can be determined. In such a case, preferably the reference correction parameter δ is contained in each group.

As a technique of comparing the correction parameters δ in different groups, a common evaluation amount in the groups can be used. For example, as the evaluation amount, the average value (or the sum total) of the identities probabilities Po represented in each group is divided by the identity probability Po based on the reference correction parameter δ and the result is used.

In the embodiment, the correction parameter δ is determined based on one detection result of the sensors. However, to enhance the validity of the correction parameter δ, preferably the above-described processing is repeated two or more times for determining the correction parameter δ. For example, as such a technique, if the number of times that the correction parameter δ has been determined most valid exceeds a predetermined determination value, confidence is placed in the correction parameter δ or if the number of times that the correction parameter δ has been determined most valid reaches the maximum, confidence is placed in the correction parameter δ. Accordingly, the correction parameter δ can be calculated with good accuracy.

The identical object determination technique is not limited to the technique of finding the identity probability Po described above. Whether or not the objects are identical may be determined based on position information and speed information errors as described in the first embodiment. However, the technique capable of quantitatively evaluating the identity probability as in the embodiment is preferred because comparison processing can be performed easily.

(Third Embodiment)

A third embodiment of the present invention differs from the second embodiment in that displacement of objects caused by the measurement time difference between the sensors is corrected. For example, to use a plurality of sensors, basically the detection timings of the sensors match. However, if the detection timings differ, particularly in a state in which the own vehicle turns, the relative positions of the objects detected by the sensors differ as the detection timings differ. If the sensors detect the identical object in such a state, there is a possibility that the objects detected by the sensors may be determined different because of the displacement.

Then, in the third embodiment, to correct an error caused by the measurement time difference, a yaw rate sensor is further included in addition to the components in the second embodiment. For example, in stereoscopic image processing, data is always delayed as long as the time required for image read and image processing. To use a first sensor S1 involved in stereoscopic image processing and a second sensor S2 of a millimeter wave radar 9 in combination, preferably lag Δt of the processing time of the stereoscopic image processing from the processing time of the millimeter wave radar 9 is provided as data. Accordingly, data is rotated by yaw rate X Δt, whereby a correction can be made.

Such relative displacement of the identical object can also be corrected according to a technique similar to that in the second embodiment in such a manner that a correction amount calculation section 14 sets a correction parameter δ to rotate data by yaw rate X Δt based on relative detection time difference Δt between one sensor and another sensor, for example. Such a technique would make it possible to correct displacement of the identical object effectively as in the second embodiment.

As described above, according to the present invention, both position information and speed information are used to determine whether or not the objects detected by a plurality of sensors are identical. Accordingly, if either of the position information and the speed information indicates approximation, the other is considered, so that whether or not the detected objects are identical can be determined precisely.

The disclosure of Japanese Patent Application No. 2002-194389 filed on Jul. 3, 2002 including the specification, drawings and abstract is incorporated herein by reference in its entirety.

While the presently preferred embodiments of the present invention have been shown and described, it is to be understood that these disclosures are for the purpose of illustration and that various changes and modifications may be made without departing from the scope of the present invention as set forth in the appended claims.

What is claimed is:

1. An identical object determination method of determining whether or not objects detected by a plurality of sensors are identical, the identical object determination method comprising:
    a first step for determining a relative position and relative speed of each of the detected objects;
    a second step for determining a position error of each of the detected objects based on the determined positions and calculating a first probability as a probability that the detected objects are identical with respect to the position from the determined position error based on a normal distribution concerning the position error when the plurality of sensors detect the identical object;
    a third step for determining a speed error of each of the detected objects based on the determined speed and calculating a second probability as a probability that the detected objects are identical with respect to the speed from the determined speed error based on a normal distribution concerning the speed error when the plurality of sensors detect the identical object;
    a fourth step for calculating a third probability as a probability that the detected objects are identical based on the calculated first probability and the calculated second probability; and
    a fifth step for determining that the detected objects are identical if the third probability exceeds a first determination value.

2. The identical object determination method as set forth in claim 1 further comprising the steps of:
    if the third probability is smaller than the first determination value, extracting the objects in any desired combination from the detected objects and calculating a fourth probability as a probability that the extracted objects, each as a processed object, are identical; and
    if the calculated fourth probability exceeds the first determination value, determining that the extracted objects are identical.

3. The identical object determination method as set forth in claim 1 wherein if at least one of the sensors detects a plurality of objects,
    the second step selects one object from among the detected objects for each sensor, thereby forming groups, each as a processed object, as different combinations and calculates the first probability as the probability that the objects making up each of the groups are identical with respect to the position,
    the third step calculates the second probability as the probability that the objects making up each of the groups are identical with respect to the speed,
    the fourth step calculates the third probability as the probability that the objects making up each of the groups are identical based on the calculated first probability and the calculated second probability, and
    the fifth step adopts the object detected by one of the sensors as the reference, determines the group having the maximum value of the third probability from among the groups containing the reference object, and if the third probability calculated for the determined group exceeds the first determination value, determines that the objects making up the determined group are identical.

4. The identical object determination method as set forth in claim 2 wherein if at least one of the sensors detects a plurality of objects, the second step selects one object from among the detected objects for each sensor, thereby forming groups, each as a processed object, as different combinations and calculates the first probability as the probability that the objects making up each of the groups are identical with respect to the position, the third step calculates the second probability as the probability that the objects making up each of the groups are identical with respect to the speed, the fourth step calculates the third probability as the probability that the objects making up each of the groups are identical based on the calculated first probability and the calculated second probability, and the fifth step adopts the object detected by one of the sensors as the reference, determines the group having the maximum value of the third probability from among the groups containing the reference object, and if the third probability calculated for the determined group exceeds the first determination value, determines that the objects making up the determined group are identical.

5. The identical object determination method as set forth in claim 4 wherein the fifth step comprises the steps of:

if the third probability calculated for a first group containing the reference object and the third probability calculated for a second group containing the reference object, different from the first group exceed each the first determination value, comparing the third probability calculated for the first group and the third probability calculated for the second group each with a second determination value greater than the first determination value; and if the third probability calculated for the first group and the third probability calculated for the second group exceed each the second determination value, determining that the objects making up the first group and the second group are identical;

if either the third probability calculated for the first group or the third probability calculated for the second group exceeds the second determination value, determining that the objects making up the group corresponding to the third probability exceeding the second determination value are identical.

6. The identical object determination method as set forth in claim 1 further comprising the step for correcting the calculated third probability based on history information indicating that the object detected by one sensor is determined identical with which of objects detected by a different sensor.

7. The identical object determination method as set forth in claim 5 further comprising the step for correcting the calculated third probability based on history information indicating that the object detected by one sensor is determined identical with which of objects detected by a different sensor.

8. The identical object determination method as set forth in claim 7 further comprising the step for correcting the calculated third probability based on history information indicating the number of successive times that the object detected by the one sensor has been determined identical with the object detected by the different sensor.

9. The identical object determination method as set forth in claim 1 further comprising the step for correcting the calculated third probability based on history information indicating the third probability calculated for the object detected by one sensor and the object detected by a different sensor.

10. The identical object determination method as set forth in claim 5 further comprising the step for correcting the calculated third probability based on history information indicating the third probability calculated for the object detected by one sensor and the object detected by a different sensor.

11. The identical object determination method as set forth in claim 1 wherein the plurality of sensors are selected from the group containing a sensor for detecting an object based on a pair of picked-up images using stereoscopic image processing, a millimeter wave radar, and a laser radar.

12. The identical object determination method as set forth in claim 8 wherein the plurality of sensors are selected from the group containing a sensor for detecting an object based on a pair of picked-up images using stereoscopic image processing, a millimeter wave radar, and a laser radar.

13. The identical object determination method as set forth in claim 10 wherein the plurality of sensors are selected from the group containing a sensor for detecting an object based on a pair of picked-up images using stereoscopic image processing, a millimeter wave radar, and a laser radar.

14. An identical object determination apparatus for determining whether or not objects detected by a plurality of sensors are identical using an identical object determination method as set forth in claim 1.

15. An identical object determination apparatus for determining whether or not objects detected by a plurality of sensors are identical using an identical object determination method as set forth in claim 12.

16. An identical object determination apparatus for determining whether or not objects detected by a plurality of sensors are identical using an identical object determination method as set forth in claim 13.

17. An identical object determination method of determining whether or not objects detected by a plurality of sensors are identical, the identical object determination method comprising:

a first step for determining a relative position and relative speed of each of the detected objects; and a second step for determining a position error of each of the detected objects based on the determined positions, comparing the determined position error with a first determination value, determining a speed error of each of the detected objects based on the determined speed, and comparing the determined speed error with a second determination value, so as to separate the detected objects into the identical object and different objects.

18. The identical object determination method as set forth in claim 17 wherein the second step determines that the detected objects are identical if the determined position error is smaller than the first determination value and the determined speed error is smaller than the second determination value.

19. The identical object determination method as set forth in claim 17 wherein the plurality of sensors are selected from the group containing a sensor for detecting an object based on a pair of picked-up images using stereoscopic image processing, a millimeter wave radar, and a laser radar.

20. The identical object determination method as set forth in claim 18 wherein the plurality of sensors are selected from the group containing a sensor for detecting an object based on a pair of picked-up images using stereoscopic image processing, a millimeter wave radar, and a laser radar.

21. An identical object determination apparatus for determining whether or not objects detected by a plurality of sensors are identical using an identical object determination method as set forth in claim 17.

22. An identical object determination apparatus for determining whether or not objects detected by a plurality of sensors are identical using an identical object determination method as set forth in claim 20.

23. A displacement correction method of correcting relative displacement of identical objects detected by one sensor and a different sensor for detecting objects in cooperation with each other, the displacement correction method comprising:
  a first step for setting a plurality of correction parameters for correcting relative displacement of the position of the object detected by the one sensor and the position of the object detected by the different sensor;
  a second step for relatively correcting the position of the object detected by the different sensor based on the correction parameter;
  a third step for determining whether or not the object detected by the one sensor and the object detected by the different sensor, the position of which is corrected based on the correction parameter are identical for each of the correction parameters; and
  a fourth step for comparing the comparison results at the third step, determining the correction parameter determined corresponding to the identical object having the best determination result, and determining a feedback correction parameter for making feedback correction of relative displacement of the identical objects detected by the one sensor and the different sensor based on the determined correction parameter.

24. The displacement correction method as set forth in claim 23 wherein the correction parameter is set based on a relative difference between an attachment position of the one sensor and an attachment position of the different sensor.

25. The displacement correction method as set forth in claim 23 wherein the correction parameter is set based on a relative detection position error between the one sensor and the different sensor.

26. The displacement correction method as set forth in claim 24 wherein the correction parameter is set based on a relative detection position error between the one sensor and the different sensor.

27. The displacement correction method as set forth in claim 23 wherein the correction parameter is set based on a relative detection time difference between the one sensor and the different sensor.

28. The displacement correction method as set forth in claim 26 wherein the correction parameter is set based on a relative detection time difference between the one sensor and the different sensor.

29. The displacement correction method as set forth in claim 23 wherein the first step to the third step are repeated two or more times and if the number of times that the correction parameter has been determined corresponding to the identical object exceeds a predetermined determination value, the feedback correction parameter is determined based on the correction parameter.

30. The displacement correction method as set forth in claim 28 wherein the first step to the third step are repeated two or more times and if the number of times that the correction parameter has been determined corresponding to the identical object exceeds a predetermined determination value, the feedback correction parameter is determined based on the correction parameter.

31. The displacement correction method as set forth in claim 23 wherein the first step to the third step are repeated two or more times and if the number of times that the correction parameter has been determined corresponding to the identical object reaches the maximum, the feedback correction parameter is determined based on the correction parameter.

32. The displacement correction method as set forth in claim 28 wherein the first step to the third step are repeated two or more times and if the number of times that the correction parameter has been determined corresponding to the identical object reaches the maximum, the feedback correction parameter is determined based on the correction parameter.

33. The displacement correction method as set forth in claim 23 wherein when comparing the comparison results at the third step, the fourth step uses only the determination result concerning the object more distant from the predetermined determination value with respect to the position.

34. The displacement correction method as set forth in claim 30 wherein when comparing the comparison results at the third step, the fourth step uses only the determination result concerning the object more distant from the predetermined determination value with respect to the position.

35. The displacement correction method as set forth in claim 32 wherein when comparing the comparison results at the third step, the fourth step uses only the determination result concerning the object more distant from the predetermined determination value with respect to the position.

36. The displacement correction method as set forth in claim 23 wherein the plurality of correction parameters are divided into a plurality of groups and the correction parameters belonging to each group are used in one process.

37. The displacement correction method as set forth in claim 34 wherein the plurality of correction parameters are divided into a plurality of groups and the correction parameters belonging to each group are used in one process.

38. The displacement correction method as set forth in claim 35 wherein the plurality of correction parameters are divided into a plurality of groups and the correction parameters belonging to each group are used in one process.

39. The displacement correction method as set forth in claim 37 wherein each group contains one common correction parameter to the groups.

40. The displacement correction method as set forth in claim 38 wherein each group contains one common correction parameter to the groups.

41. The displacement correction method as set forth in claim 23 wherein the third step uses an identical object determination method, comprising:
  determining a relative position and relative speed of each of the detected objects;
  determining a position error of each of the detected objects based on the determined positions and calculating a first probability as a probability that the detected objects are identical with respect to the position from the determined position error based on a normal distribution concerning the position error when the plurality of sensors detect the identical object;
  determining a speed error of each of the detected objects based on the determined speed and calculating a second probability as a probability that the detected objects are identical with respect to the speed from the determined speed error based on a normal distribution concerning the speed error when the plurality of sensors detect the identical object;

calculating a third probability as a probability that the detected objects are identical based on the calculated first probability and the calculated second probability; and determining that the detected objects are identical if the third probability exceeds a first determination value.

42. A displacement correction apparatus for correcting relative displacement of identical objects detected by a plurality of sensors for detecting objects in cooperation with each other using a displacement correction method as set forth in claim 23.

43. The identical object determination method as set forth in claim 17, wherein the objects are detected by the plurality of sensors substantially at a same time.

* * * * *